(12) United States Patent
Samuel

(10) Patent No.: US 11,809,440 B2
(45) Date of Patent: Nov. 7, 2023

(54) UNIVERSAL PRE-PROCESSOR FOR EXTRACTING AND JOINING DATA

(71) Applicant: Capital One Services, LLC, McLean, VA (US)

(72) Inventor: Jemima Samuel, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/230,546

(22) Filed: Apr. 14, 2021

(65) Prior Publication Data

US 2022/0335052 A1 Oct. 20, 2022

(51) Int. Cl.
*G06F 16/25* (2019.01)
*G06F 16/16* (2019.01)

(52) U.S. Cl.
CPC ............ *G06F 16/254* (2019.01); *G06F 16/16* (2019.01)

(58) Field of Classification Search
CPC .............................. G06F 16/254; G06F 16/16
See application file for complete search history.

(56) References Cited

U.S. PATENT DOCUMENTS

| | | | |
|---|---|---|---|
| 10,733,198 B1* | 8/2020 | Marschner | G06F 16/252 |
| 2017/0223003 A1* | 8/2017 | Miles | G06F 21/6254 |
| 2018/0157723 A1* | 6/2018 | Chougule | G06F 16/288 |
| 2019/0147371 A1* | 5/2019 | Deo | G06N 20/20 |
| | | | 706/12 |

FOREIGN PATENT DOCUMENTS

JP 2014528628 A 10/2014

* cited by examiner

*Primary Examiner* — Charles D Adams
(74) *Attorney, Agent, or Firm* — Harrity & Harrity, LLP

(57) ABSTRACT

In some implementations, a device may receive a first data set configuration and a second data set configuration. The device may receive a first set of input data sets based on the first data set configuration and a second set of input data sets based on the second data set configuration. The device may process, by executing a single set of executable code and based on the first data set configuration, the first set of input data sets. The device may process, by executing the single set of executable code and based on the second one or more parameters, the second data set configuration. The device may generate a first output file based on the desired data from the first set of input data sets. The device may generate a second output file based on the desired data from the second set of input data sets.

20 Claims, 5 Drawing Sheets

UNIVERSAL PRE-PROCESSOR FOR EXTRACTING AND JOINING DATA

BACKGROUND

Data gathering (or data mining) methods are often loosely controlled. This may result in obtaining out-of-range values, impossible data combinations, and/or missing values, among other examples. Analyzing data that has not been carefully screened for such problems can produce misleading results. Therefore, data pre-processing (e.g., data preparation and/or filtering) to transform raw data into a useful and efficient format may be an important step before running any analysis on collected data. Data preparation and filtering steps can take considerable amounts of processing time. Data pre-processing may include cleaning, instance selection, normalization, transformation, and/or feature extraction and selection, among other examples.

SUMMARY

In some implementations, a system for pre-processing data from different input sources and with different configurations using a single set of executable code includes one or more memories and one or more processors, coupled to the one or more memories, configured to: receive configuration information that includes a first data set configuration and a second data set configuration, wherein the first data set configuration indicates information for pre-processing data in a first manner and the second data set configuration indicates information for pre-processing data in a second manner; receive a first set of input data files based on the first data set configuration; receive a second set of input data files based on the second data set configuration; process, by executing the single set of executable code and based on the first data set configuration, the first set of input data files, wherein processing the first set of input data files includes extracting desired data from the first set of input data files and joining the desired data into a first output file; process, by executing the single set of executable code and based on the second data set configuration, the second set of input data files, wherein processing the second set of input data files includes extracting desired data from the second set of input data files and joining the desired data into a second output file; transmit the first output file based on the first data set configuration; and transmit the second output file based on the second data set configuration.

In some implementations, a method for pre-processing data from different input sources and with different configurations using a single set of executable code includes receiving, by a device, a first data set configuration and a second data set configuration, wherein the first data set configuration indicates a first one or more parameters for pre-processing data and the second data set configuration indicates a second one or more parameters for pre-processing data; receiving, by the device, a first set of input data sets based on the first data set configuration; receiving, by the device, a second set of input data sets based on the second data set configuration; processing, by the device executing the single set of executable code and based on the first one or more parameters, the first set of input data sets, wherein processing the first set of input data sets includes extracting desired data from the first set of input data sets and joining the desired data from the first set of input data sets; processing, by the device executing the single set of executable code and based on the second one or more parameters, the second set of input data sets, wherein processing the second set of input data sets includes extracting desired data from the second set of input data sets and joining the desired data from the second set of input data sets; generating, by the device, a first output file based on the desired data from the first set of input data sets; and generating, by the device, a second output file based on the desired data from the second set of input data sets.

In some implementations, a non-transitory computer-readable medium storing a set of instructions includes one or more instructions that, when executed by one or more processors of a system, cause the system to: receive configuration information that includes a data set configuration, wherein the data set configuration indicates information for pre-processing data in a first manner, and wherein the data set configuration enables a pre-processor to process data in the first manner without modifying code associated with the pre-processor; receive a set of input data files based on the data set configuration; extract, by the pre-processor, desired data from the set of input data files based on one or more parameters indicated by the data set configuration; join the desired data from the set of input data files into an output file based on the one or more parameters indicated by the data set configuration; and transmit the output file based on the one or more parameters indicated by the data set configuration.

DETAILED DESCRIPTION

Figure 1:
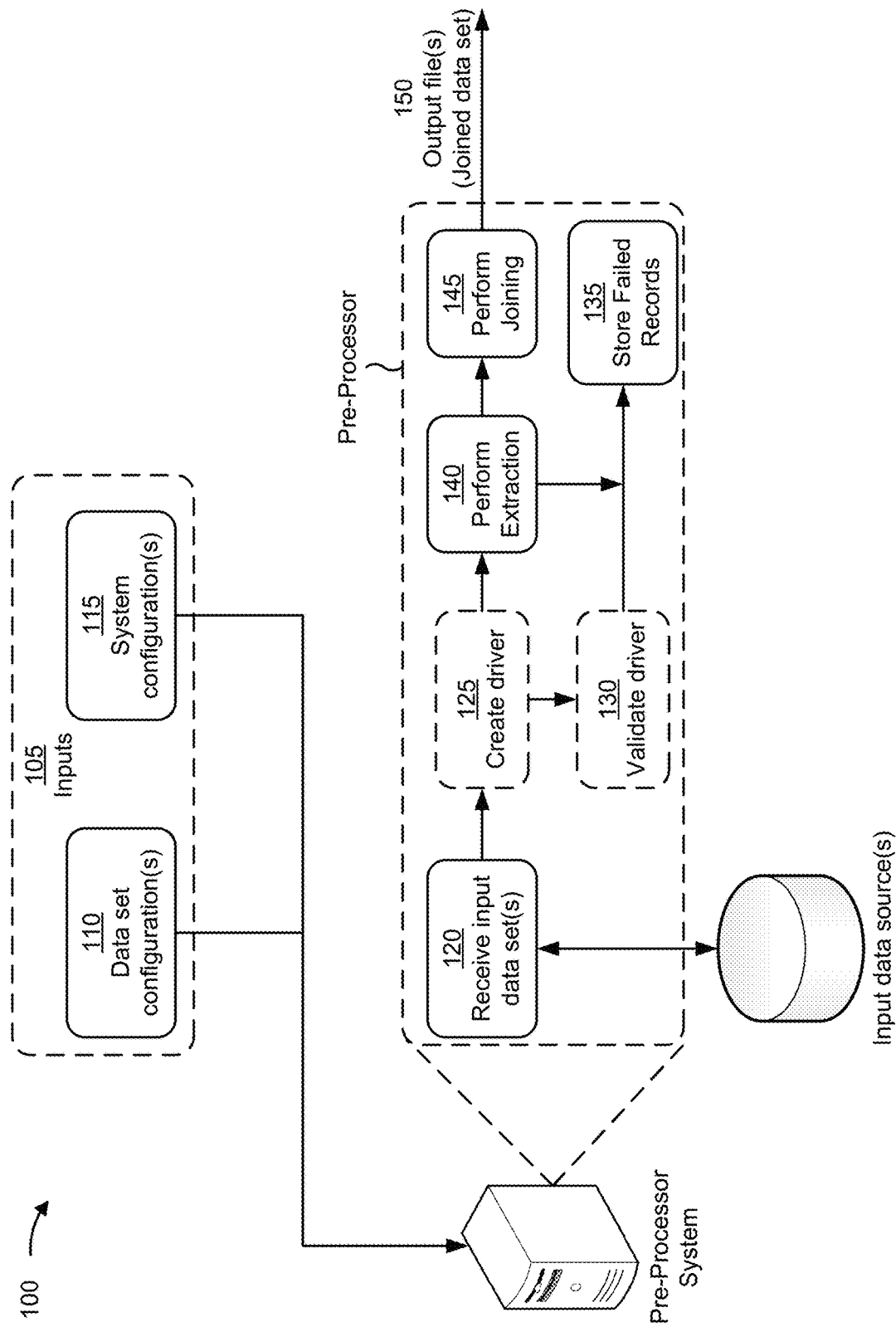
FIGS. 1 and 2 are diagrams of an example implementation relating to a universal pre-processor for extracting and joining data.

The following detailed description of example implementations refers to the accompanying drawings. The same reference numbers in different drawings may identify the same or similar elements.

Data processing platforms are often designed to perform many data processing jobs. Multiple data processing jobs may be performed by a data processing platform at any given time, and the data used for performing the data processing jobs may come from a variety of data sources. Some data processing jobs may use, as input data, data that comes from a single data source, while other data processing jobs may use input data from a variety of data sources. In some cases, input data may include millions, trillions, and/or billions of data entries, columns, and/or rows. For data analysis (e.g., "big data" analysis) input data sets may need to be combined to form an input for the big data analysis.

For example, in some cases, input data may be required to be filtered, aggregated, normalized, and/or transformed, among other examples to obtain desired data for the data analysis. For example, certain columns of a data set or certain type of information may be desired as an input for the big data analysis. Therefore, prior to performing the big data analysis, the input data may need to be pre-processed to extract the desired data from the input data and join the desired data together from multiple input data sets to create a single output file that can be used as an input to the big data analysis. "Pre-processing" refers to the process of receiving one or more input data sets, extracting data from the one or more input data sets, and joining the extracted data into one or more output data sets (e.g., in a format that enables the output data sets to be used as an input for data analysis).

However, pre-processing requires that an executable program that may cause a device to perform the pre-processing be hard coded (e.g., with fixed data or parameters in the program in such a way that the data or parameters cannot be altered without modifying the code of the program). For example, filtering conditions, processing parameters, input data parameters (e.g., data source locations, file names, column header names, and/or column identifiers), output data parameters (e.g., output data format and/or output location), and/or any other parameters required for the pre-processing process may be static and hard coded for the executable program associated with the pre-processor. For example, if an input data source changes (e.g., if a name of a column of an input data set changes) the code for the executable program may need to be modified and/or re-written. As another example, if an input file is no longer needed for the data analysis, the code for the executable program may need to be modified and/or re-written to remove the input file. In other words, the code for the hard coded pre-processor may need to be specific to the input data sets and/or the parameters used for pre-processing those specific input data sets. Modifying and/or re-writing the code introduces a cascading effect of additional changes in the code that causes significant overhead (e.g., processing overhead and/or development time) associated with updating the code for the pre-processor for even small changes, such as changing a name of a column of an input data set.

Some techniques and implementations described herein enable a universal pre-processor for extracting and joining data that uses a single set of executable code for performing pre-processing for different filtering conditions, different processing parameters, different input data parameters, and/or different output data parameters, among other examples. The universal pre-processor may use different configuration files to enable the single set of executable code to pre-process data in different manners without modifying the single set of executable code. For example, a configuration (e.g., a data set configuration) may indicate one or more parameters for pre-processing data, such as input data set parameters (e.g., locations of input data sets), filtering condition parameters, processing parameters, and/or output data parameters, among other examples. The universal pre-processor may execute the single set of executable code to cause the universal pre-processor to receive, process, and/or output data in accordance with the configuration (e.g., the data set configuration).

This enables the universal pre-processor to pre-process a first set of input data in accordance with a first configuration (e.g., to pre-process data in a first manner) and the pre-process a second set of input data in accordance with a second configuration (e.g., to pre-process data in a second manner) without modifying or re-writing any of the executable code for the universal pre-processor. Additionally, this enables changes to the pre-processing parameters to be modified in the configuration. Therefore, changes to the manner of pre-processing and/or to any of the parameters associated with the pre-processing may only require a change to the configuration (e.g., which may be in an easy to read and/or modify format, such as a JavaScript Object Notation (JSON) format) and may not require modifying or re-writing any of the executable code for the universal pre-processor. For example, the universal pre-preprocessor may be used in ad hoc scenarios (e.g., for short term scenarios and/or specific tasks) by generating a configuration file and executing the single set of executable code in accordance with the configuration file. This significantly reduces the overhead that would have otherwise been required to create executable code for each pre-processing in each ad hoc scenario.

As a result, overhead associated with pre-processing may be significantly reduced by using the universal pre-processor. For example, process time and/or development time associated with creating, modifying, and/or re-writing code for a pre-processor may be significantly reduced by using the configuration driven format of the universal pre-processor that enables a single set of executable code to be used for any input data sets and/or any processing parameters. Moreover, this conserves computing resources (e.g., processing resources and/or memory resources) by enabling a single set of executable code to be run and/or stored for pre-processing without requiring separate sets of executable code for different pre-processing configurations.

FIG. 1 is a diagram of an example 100 associated with a universal pre-processor for extracting and joining data. As shown in FIG. 1, example 100 includes a pre-processor system, and one or more input data sources. These devices are described in more detail below in connection with FIG. 3 and FIG. 4.

As shown in FIG. 1, the pre-processor system may receive one or more inputs 105 to enable the pre-processor system to pre-process input data in accordance with a manner or technique indicated by the one or more inputs 105. For example, as shown by reference number 110, an input 105 may include a data set configuration. A data set configuration may indicate information for pre-processing data in a first manner. For example, the data set configuration may indicate one or more parameters for pre-processing data. Another (e.g., a second) data set configuration may indicate information for pre-processing data in a second manner (e.g., may indicate different parameters for pre-processing data).

For example, a data set configuration may indicate and/or identify an indication of, or a location of, input data files associated with the data set configuration. For example, the data set configuration may identify an indication of an input data source that stores or includes an input data file or input data set. In some implementations, the data set configuration may indicate an address associated with an input data file or input data set. In some implementations, the data set configuration may indicate one or more file type parameters. A file type parameter may indicate a file name, a file type (e.g., a domain of the input file or a use case associated with the input file), and/or an indication of whether an input file is a primary or a master input file. For example, a file type parameter may indicate whether the input data set is associated with a certain use case or a certain data type.

In some implementations, the data set configuration may indicate one or more validation parameters. A validation parameter may be a parameter used by the pre-processor system to validate an output data set generated by the pre-processor system. For example, a validation parameter may include an indication of whether the pre-processor is to check if duplicate data records are generated (e.g., indicating a failure, as described in more detail below) for an input data file. In some implementations, a validation parameter may be an indicator of a primary column or data record to be used to validate the output data set generated by the pre-processor system. In some implementations, a validation parameter may include an indication of a data record or column that will be used to add a bad or failed data record to (e.g., if a bad or failed data record is identified by the pre-processor system as part of the validation process, as explained in more detail below).

In some implementations the data set configuration may indicate one or more column identifiers of columns to be included in an output file. For example, an input data file or an input data set may include many (e.g., tens, hundreds, or thousands) of columns or data entries. The data set configuration may indicate one or more columns to be selected from the input data set to be included in the output data set generated by the pre-processor system. In some implementations, the data set configuration may indicate one or more columns to be dropped (or not included in the output data set) from the input data set.

In some implementations the data set configuration may indicate one or more filter parameters. A filter parameter may be a parameter used by the pre-processor system to filter data from an input data set or an input data file. For example, a filter parameter may be a filter input parameter that indicates an object as an input for a filtering step performed by the pre-processor system, as explained in more detail below. In some implementations, a filter input parameter may indicate one or more data records and/or one or more columns from an input data set to be filtered (e.g., by indicating a column identifier and/or a criteria for data in the identified column to be filtered). In some implementations, a filter parameter may indicate one or more filter criteria. A filter criteria may indicate an operation, such as equal to (e.g., filtering by values that are equal), less than or equal to (e.g., filter by values that are less than or equal a filter input value), maximum (e.g., filtering to identify a maximum value from the data to be filtered), minimum (e.g., filtering to identify a minimum value from the data to be filtered), ascending (e.g., filtering by ascending values), descending (e.g., filtering by descending values), and/or ascending and/or descending without including a first or last value, among other examples. In some implementations, a filter parameter may be a filter input value parameter that indicates a value to be used for a filtering step performed by the pre-processor system (such as a value to be used for a filter criteria described above).

In some implementations the data set configuration may indicate one or more driver parameters. A driver parameter may be a parameter used by the pre-processor system to generate a driver data set, as explained in more detail below. A driver data set may be a data set used to identify data records and/or identifiers to be included in the output data set generated by the pre-processor system. For example, a driver data set may indicate a set of account identifiers to be included in the output data set generated by the pre-processor system. The pre-processor system may use the driver data set to filter the other input data sets or input data files to extract the data records and/or identifiers indicated by the driver data set. A driver parameter may include an indication of whether an input data set or an input data file is a driver data input (e.g., is an input to be used to create a driver data set). In some implementations, a driver parameter may indicate a driver run type, such as seeding (e.g., being used to seed or populate a data set) or a daily run, among other examples. In some implementations, a driver parameter may indicate a driver input (e.g., an object of a driver input mode or an input to be used to create the driver data set), a driver input column (e.g., a column name that will be used for joining to create the driver data set), one or more re-naming or casing inputs for the driver (e.g., similar to a casting parameters described in more detail below), one or more driver filter parameters (e.g., similar to the filter parameters described above), and/or one or more columns to be selected from the input data set to be included in the driver data set generated by the pre-processor system. In some implementations, a driver parameter may indicate one or more data records to be purged or removed from the input data sets or the input data files, as explained in more detail below.

In some implementations the data set configuration may indicate one or more casting parameters. A casting parameter may be a parameter used by the pre-processor system to identify one or more changes to data records and/or columns header names, among other examples. For example, a casting parameter may indicate an input of data associated with a casting operation (e.g., an array of objects or data records to be re-named or re-formatted). In some implementations, a casting parameter may indicate on original or current name of a column and a new or changed name of a column. In some implementations, a casting parameter may indicate a new data type for data records included in an input data set. For example, a casting parameter may indicate that data is to be modified from a string format to a number format (or from a number format to a string format). In some implementations, a casting parameter may indicate that one or more columns are to be concatenated into a single column or linked columns. In some implementations, a casting parameter may indicate a regular expression rule for modifying data, such as modifying one symbol or value in a data entry to another symbol or value (or removing the symbol or value).

In some implementations the data set configuration may indicate one or more window specification parameters. "Window specification" may refer to one or more rows that are included in a window (e.g., a frame) of a data set, such as a set of rows that are associated with a row by some relation. A window specification parameter may indicate one or more window specification functions, such as a function that is to be applied after the data set is partitioned and ordered in the window. "Window specification" and/or "window specification functions" may be defined or otherwise associated with Apache Spark®. In some implementations, a window specification parameter may indicate a window specification input (e.g., a set of columns or a set of rows to be included or portioned into a window). In some implementations, a window specification parameter may indicate how data records included in the window are to be ordered (e.g., by identifier, ascending values, and/or descending values). In some implementations, a window specification parameter may indicate a window specification function to be applied to the data entries included in the window, such as a rank function or a row function, among other examples.

In some implementations the data set configuration may indicate one or more aggregation parameters. An aggregation parameter may be a parameter used by the pre-processor system to aggregate data included in input data sets or input data files. For example, an aggregation parameter may indicate one or more columns to be aggregated together. In some implementations, an aggregation parameter may indicate an operation or a criteria to be used to filter aggregated columns (e.g., maximum, minimum, mean, and/or sum). For example, an aggregation parameter may indicate that two columns are to be aggregated together and the pre-processor system is to filter the aggregated columns by one or more criteria (e.g., a first criteria for a first column and a second criteria for a second column).

In some implementations, a data set configuration may be associated with different input data types. Input data types may include hard dependency inputs and soft dependency inputs. "Hard dependency input" may refer to an input that is dependent on the date the data is generated. For example, hard dependency inputs may include inputs from sources that are updated periodically (e.g., daily) and/or in real-time. Therefore, for hard dependency inputs, a date associated with the input may impact the data that is included in the input data file (e.g., an input associated with a first date may be different than an input associated with a second date). "Soft dependency input" may refer to an input that is not dependent on the date the data is generated. For example, soft dependency inputs may include lookup tables, reconciliation data sources (e.g., data sources containing bad or failed data records from previous jobs), purge data sources (e.g., data records to be purged from a data set), and/or any other input source that is associated with data that is substantially static or unchanging over time. For a soft dependency input, the data set configuration may indicate a process type (e.g., reconciliation, lookup, and/or purge) in addition to parameters described above.

As shown by reference number 115, an input 105 may include a system configuration. A system configuration may be a configuration that indicates security information, logging information, and/or other system information associated with the pre-processing operation to be performed by the pre-processor system. The system configuration may enable the pre-processor system to identify a role or use associated with the system configuration to ensure that data records that are not associated with the role or use are not identified in output data sets. This improves the security of the data by ensuring that unauthorized users or systems are unable to access protected data. For example, a system configuration may indicate security information, such as an authentication code or an authentication key, a security key, a client identifier, a client security key (e.g., a key needed to generate an output file), and/or an application programming interface (API) gateway (e.g., an address of an API gateway needed to create an authentication token), among other examples.

In some implementations, the system configuration may indicate an indication of or a location of one or more data set configurations. For example, the system configuration may indicate an address of a storage location for a data set configuration. In some implementations, a system configuration may indicate an output location for output files (e.g., a location or an address where the pre-processor system is to transmit and/or store output data sets).

In some implementations, the system configuration may indicate identifier information. For example, the system configuration may indicate a client identifier, or a user identifier associated with the system configuration. The identifier information may be used by the pre-processor system to generate log file or log information associated with output data sets generated by the pre-processor system that are associated with the system configuration. In some implementations, the system configuration may indicate environment information, such as parameters required for different environments associated with the pre-processing operation (e.g., address locations, security keys, geographic location identifiers, and/or user or client identifiers). In some implementations, the system configuration may indicate termination and/or validation information. For example, the system configuration may indicate a number or percentage of failed data records that trigger a termination of the pre-processing operation.

In some implementations, the data set configuration(s) and/or the system configuration(s) may be generated using a human readable code. For example, the data set configuration(s) and/or the system configuration(s) may be generated in a JSON format. This enables the configurations to be generated and input to the pre-processor system in less time and with less overhead as compared to generating the configurations in a more complex format, such as a non-human readable code format that may require more time and/or may training to generate.

As shown in FIG. 1, the data set configuration(s) and/or the system configuration(s) may enable the pre-processor system to perform pre-processing of data indicated by the data set configuration(s) and/or the system configuration(s) and in a manner indicated by the data set configuration(s) and/or the system configuration(s). For example, the pre-processor system may store a set of executable code (e.g., a Java archive (JAR) file) that processes the data set configuration(s) and/or the system configuration(s) to perform pre-processing of data. As described above, the set of executable code (e.g., the JAR file) may be used by the pre-processor system for different data set configuration(s) and/or different system configuration(s) to enable the pre-processor system to perform data pre-processing in different manners and/or for different input data sets using the same set of executable code (e.g., the same JAR file). For example, operations described herein in connection with pre-processing may be performed by the pre-processor system by executing the set of executable code on the pre-processor system.

As shown by reference number 120, the pre-processor system may receive one or more input data sets or input data files. For example, the pre-processor system may identify a location and/or an input data source associated with an input data set based on the data set configuration and/or the system configuration. The pre-processor system may communicate with the input data source to receive and/or obtain the input data set. The pre-processor system may perform a similar operation to receive all input data sets indicated by the data set configuration and/or the system configuration.

As shown by reference number 125, the pre-processor system may optionally create a driver data set. For example, creating a driver data set may be a configuration option may be selected and/or configured by the data set configuration. For example, an input data set may be indicated as a driver input data set by a driver parameter of the data set configuration. Alternatively, no input data sets may be indicated as a driver input data set by the data set configuration and the pre-processor system may not perform the operations to create and/or validate the driver data set. If an input data set is indicated as a driver input data set by a driver parameter of the data set configuration, then the pre-processor system may use the input data set to generate a driver data set. For example, the pre-processor system may filter at least one input data set (e.g., at least one input data file) from a set of input data files based on a driver filter parameter indicated by the data set configuration. The pre-processor system may select one or more data entries (e.g., one or more columns and/or one or more data records) in the at least one input data file based on a driver input parameter indicated by the data set configuration. The pre-processor system may create, using the at least one input data file, a driver data set based on filtering the at least one input data file and selecting the one or more data entries. Creating the driver data set is described in more detail below in connection with FIG. 2.

As shown by reference number 130, the pre-processor system may optionally perform a driver validation to determine whether data records indicated by the driver input parameter are included in the driver data set. For example, the data set configuration may indicate a set of records or a set of identifiers that are to be included in the driver data set. The pre-processor system may determine whether the set of records or the set of identifiers that are indicated by the data set configuration are included in the driver data set generated by the pre-processor system. As shown by reference number 135, if the pre-processor system identifies that one or more of the set of records or a set of identifiers that are indicated by the data set configuration are not included in the driver data set, then the pre-processor system may determine that the driver data set includes one or more failed records. The pre-processor system may store the failed records (e.g., the driver data set that does not include all of the set of records or the set of identifiers that are indicated by the data set configuration). For example, the pre-processor system may store the failed records in a reconciliation data store to be processed by the pre-processor system at a later time, as described in more detail below in connection with FIG. 2.

As shown by reference number 140, the pre-processor system may process the set of input files and/or the set of input data sets to extract desired data from the set of input data files and/or the set of input data sets. Desired data may refer to data that is indicated or identified by the data set configuration. For example, the pre-processor system may extract, by executing the set of executable code (e.g., the JAR file) and based on the data set configuration, the desired data from the set of input data files by performing one or more actions. For example, the pre-processor system may filter a partition (e.g., a window specification) of a data set included in the first set of input data files using a rank function and/or a row number function, among other examples. In some implementations, the pre-processor system may extract the desired data from the first set of input data files based on a driver data set. In some implementations, the pre-processor system may filter one or more data records included in the set of input data files based on one or more filter parameters indicated by the data set configuration. In some implementations, the pre-processor system may aggregate one or more data records included in the set of input data files to identify one or more data entries based on an aggregation function indicated by the data set configuration. In some implementations, the pre-processor system may cast (or re-name/re-format) one or more data records included in the set of input data files to a new column or a new format based on a casting parameter indicated by the data set configuration. In some implementations, the pre-processor system may nest one or more data records included in the set of input data files to create a data array of the one or more data records based on a nesting parameter indicated by the data set configuration. The actions described above in connection with the extraction process are provided as examples and other actions are possible. Extracting the data from input data files or input data sets is described in more detail below in connection with FIG. 2.

As shown by reference number 145, the pre-processor system may process the set of input files and/or the set of input data sets to join the extracted desired data into one or more output data files or output data sets. For example, the pre-processor system may join the desired data into an output data file based on a file type indicated by the data set configuration. In some implementations, the pre-processor system may join the desired data into an output data file, where the output data file includes a first data set that is joined based on a first file type indicated by the first data set configuration, and a second data set that is joined based on a second file type indicated by the first data set configuration. Joining the data from input data files or input data sets is described in more detail below in connection with FIG. 2.

In some implementations, the pre-processor system may perform a validation process to validate that the set of input data files has been processed (pre-processed correctly based on the data set configuration and/or the system configuration. For example, the pre-processor system may determine whether an improper duplicated data record has been generated by the pre-processor system. For example, in some cases (e.g., where the output data is not to be in an array format), the output data file generated by the pre-processor system may be expected to include only one data record for a certain entry or a certain identifier (e.g., one data record for a single account). However, in some cases, an improper duplicated data record may be generated by the pre-processor system. Therefore, the pre-processor system may determine that this is a failed data record and may store the failed data record in a similar manner as described above. This may ensure that the failed data record is not included in the output data file as including the failed data record in the output data file may cause problems when the in the output data file is analyzed and/or processed at a later time.

As shown by reference number 150, the pre-processor system may transmit one or more output data files and/or one or more output data sets based on extracting and/or joining the set of input data files, as described herein. For example, the pre-processor system may transmit (e.g., output) a first output data file based on a first data set configuration (e.g., based on pre-processing a first set of input data files in accordance with the first data set configuration, as described herein). The pre-processor system may transmit (e.g., output) a second output data file based on a second data set configuration (e.g., based on pre-processing a second set of input data files in accordance with the second data set configuration, as described herein). For example, the pre-processor system may write or store an output data file in a location or data store indicated by the data set configuration and/or the system configuration. As a result, the pre-processor is enabled to output pre-processed data files that are generated in different manners and/or using different input data files (e.g., based on the data set configuration and/or system configuration) using the same set of executable code for the pre-processing operations.

As indicated above, FIG. 1 is provided as an example. Other examples may differ from what is described with regard to FIG. 1.

Figure 2:
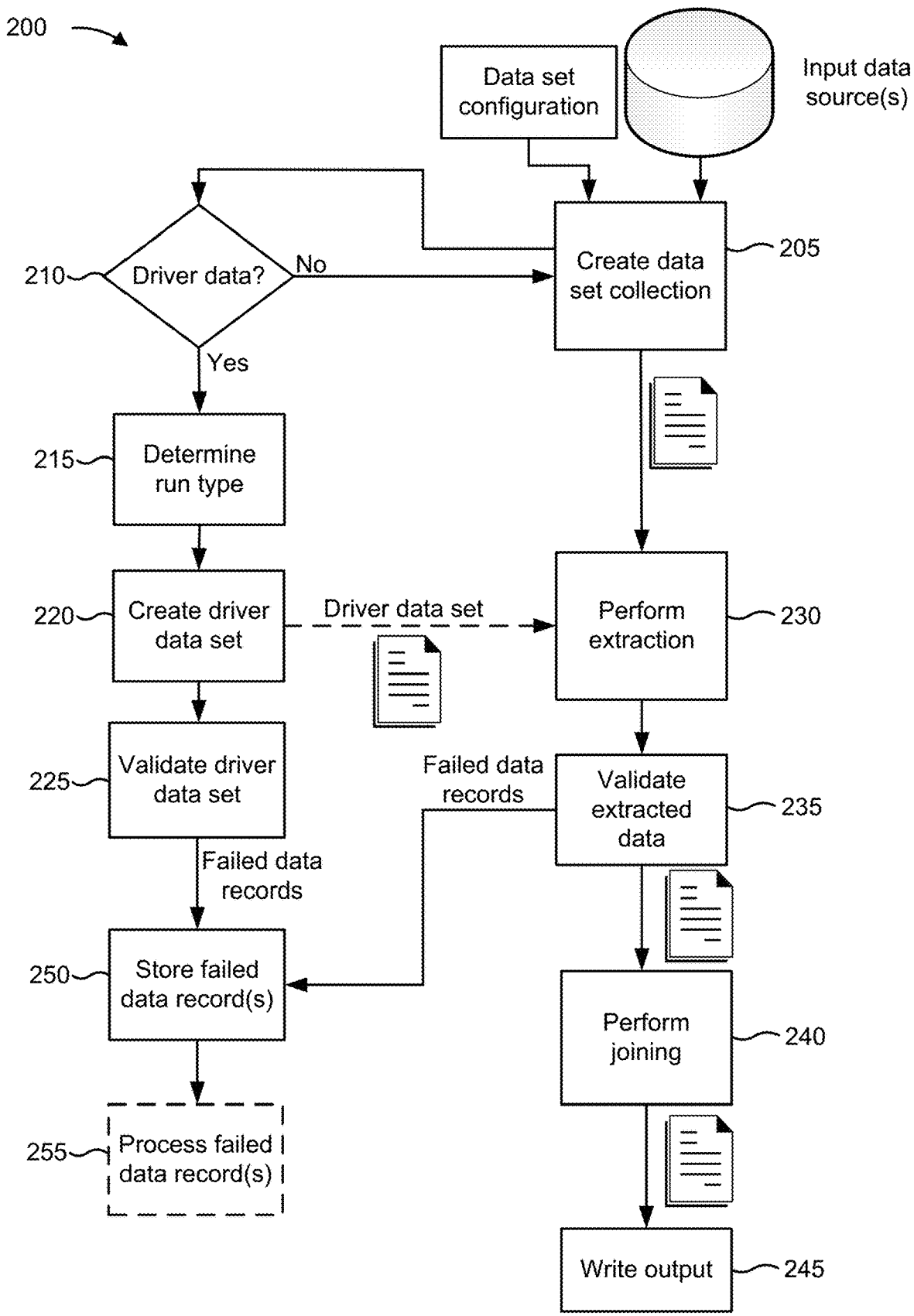

FIG. 2 is a diagram of an example 200 associated with a universal pre-processor for extracting and joining data. FIG. 2 shows an example process performed by a pre-processor system, such as the pre-processor system described above in connection with FIG. 1. For example, the process depicted in FIG. 2 may be performed by the pre-processor shown in FIG. 1. As shown in FIG. 2, a data set configuration (and/or a system configuration) may be input to enable the pre-processor system to process (e.g., pre-process) a set of input data sets (e.g., a set of input data files) in a manner indicated by the data set configuration using a single set of executable code. As described above, the single set of executable code may be used by the pre-processor system to process (e.g., pre-process) a set of input data sets (e.g., a set of input data files) in a manner indicated by other data set configurations using the same set of executable code (e.g., without requiring modifications to, additions to, or alterations of the executable code of the pre-processor).

For example, as shown in FIG. 2, the pre-processor system may receive a data set configuration (and/or a system configuration). The pre-processor system may receive a set of input data sets (e.g., input data files) from one or more input data sources. The pre-processor system may create (e.g., generate) a data set collection that includes the set of input data sets (block 205). For example, the pre-processor system may parse the data set configuration to identify one or more input data sets (e.g., input data files). The pre-processor system may identify one or more objects indicated by the data set configuration and may obtain the set of input data sets based on identifying one or more objects indicated by the data set configuration. For example, the data set configuration may indicate a location or an address (e.g., in an input data source) associated with a storage location of an input data set to be included in the pre-processing operation. The pre-processor system may obtain (e.g., pull) the input data set from the location or the address indicated by the data set configuration.

The pre-processor system may determine whether an input data set is an input driver data set (block 210). For example, the data set configuration may indicate (e.g., using a driver input parameter) whether an input data set is an input driver data set. As described above in connection with FIG. 1, an input driver data set may be an input data set that is used to generate a driver data set. If the input data set is not an input driver data set (block 210—No), then the pre-processor may not use the input data set to generate a driver data set (e.g., may not perform any actions using the input data set associated with driver creation). If the input data set is an input driver data set (block 210—Yes), then the pre-processor system may proceed with performing one or more actions to generate a driver data set using the input data set, as explained in more detail below.

As described above in connection with FIG. 1, a driver data set may be a data set used to identify data records and/or identifiers to be included in the output data set generated by the pre-processor system. In other words, the driver data set may indicate a subset of information, from a set of information indicated by an input data set, that is to be included in the output data set generated by the pre-processor system. For example, a driver data set may indicate a subset of account identifiers, from a set of account identifier indicated by the input data set, to be included in the output data set generated by the pre-processor system.

The pre-processor system may determine a run type associated with the input data set (block 215). For example, run types may include daily runs (e.g., runs used to populate a data set on a daily basis or on another periodic basis). In some implementations, a run type may be a seeding run (e.g., used to seed a data set, such as for an initial creation of a data set). The run type may be used by the pre-processor system to create the driver data set in accordance with the run type. For example, some data records or identifiers may be marked or identified in the data set configuration as purge data (e.g., data to be removed by the pre-processor system). Therefore, if a run type is a seeding run, the pre-processor system may use the run type indicating purge data to remove the data identified as purge data when generating the driver data set (e.g., to ensure that the purge data is not seeded into the data set output by the pre-processor system).

The pre-processor system may create or generate a driver data set based on the input data set and one or more driver parameters indicated by the data set configuration (block 220). For example, the pre-processor system may filter the input data set based on a driver input filter parameter. The driver input filter parameter may indicate information (e.g., the subset of information) to be included in the driver data set. The pre-processor system may use the driver input filter parameter to filter the input data set to identify the information (e.g., the subset of information) to be included in the driver data set. In some implementations, the pre-processor system may perform one or more casting operations to re-name and/or re-format the input data set. For example, the pre-processor system may perform one or more casting operations to ensure that the information to be included in the driver data set is uniform and can be combined or joined successfully. For example, two columns of the input data set may include account identifiers to be included in the driver data set, with a first column being named "account identifier" and a second column being named "identifier." The pre-processor system may perform one or more casting operations to rename the first column and the second column as the same name (e.g., change the name of the second column to "account identifier") to ensure that the information to be included in the driver data set is uniform and can be combined or joined successfully. For example, the data set configuration may indicate one or more driver cast parameters that indicate the one or more casting operations to be performed by the pre-processor system.

In some implementations, the pre-processor system may select one or more columns (and/or one or more elements) from the input data set to be included in the driver data set. For example, the data set configuration may indicate a driver input select columns parameter that indicated an array of (e.g., one or more) columns of the input data set to be included in the driver data set. In some implementations, the data set configuration may indicate a driver input primary column parameter that indicates a column name to be used by the pre-processor for joining to create the driver data set. For example, the driver input primary column parameter may indicate a primary column for creating or generating the driver data set.

In some implementations, the pre-processor system may perform a purge operation to remove data from the input data set when creating the driver data set. For example, as described above, the data set configuration may indicate one or more purge values and/or one or more purged data records to be removed (e.g., that are not to be included in outputs generated by the pre-processor system). The pre-processor system may identify the one or more purge values and/or one or more purged data records and may parse the input data set and remove any data matching the one or more purge values and/or one or more purged data records. In this way, the pre-processor system may create the driver data set that does not include data that is not to be included in outputs generated by the pre-processor system. As described above, the driver data set is an optional configuration and in some cases no driver data set may be created by the pre-processor system (e.g., based on the data set configuration).

In some implementations, the pre-processor system may perform a driver validation to determine whether data records indicated by a driver parameter are included in the driver data set (block 225). In some implementations, the data set configuration may indicate whether driver validation is to be performed by the pre-processor system. The driver validation may ensure that the subset of information, from a set of information indicated by an input data set, that is to be included in the output data set generated by the pre-processor system is included in the driver data set created by the pre-processor system. For example, the pre-processor system may parse the created driver data set to ensure that the information indicated by the data set configuration (e.g., indicated to be included in the driver set) is included or identified in the created driver data. This ensures that the pre-processor system does not attempt to pre-process data using a driver data set that is missing information to be included in outputs generated by the pre-processor system. This conserves resources that would have otherwise been used to pre-process data using a driver data set that is missing information, resulting in a failed or improper output by the pre-processor system.

The pre-processor system may perform extraction using the set of input data set (e.g., the data set collection) to extract desired data from the set of input data sets (block 230). For example, the pre-processor system may extract the desired data from the set of input data sets based on one or more parameters indicated by the data set configuration and/or based on the created driver data set, among other examples. For example, the pre-processor system may perform a window specification function (or operation) to filter a partition (e.g., a window) of a data set included in the first set of input data sets. For example, the pre-processor system may perform the window specification function based on one or more window specification parameters indicated by the data set configuration. In some implementations, the pre-processor system may partition one or more columns and/or one or more rows of an input data set to create a window. For example, the pre-processor system may sort or group one or more columns and/or one or more rows of an input data set by a variable or a criterion. In some implementations, the pre-processor system may rank a window, aggregate values or entries (e.g., identify a minimum value, maximum value, average value, a count or mode of values, and/or a sum of values) included in a window, and/or analyze values (e.g., a cumulative distance between values, a lag value, and/or a lead value) included in a window, among other examples. As described above, the data set configuration may indicate if a window specification operation is to be performed for an input data set and may indicate one or more window specification operations to be performed by the pre-processor system.

In some implementations, the pre-processor system may perform extraction by extracting the desired data from one or more input data sets based on a created driver data set. For example, as shown in FIG. 2, the created driver set may be provided for the extraction operation. The pre-processor system may filter an input data set using the created driver data set to identify information in the input data set matching or associated with the created driver data set. In some implementations, the data set configuration may indicate, for one or more (or all) input data sets, whether an input data set is to be filtered using the driver data set. For example, in some cases, even if a driver data set is created, some input data sets may not be filtered using the driver data set. The data set configuration may enable the pre-processor system to identify the input data sets that are to be filtered using the created driver data set. For example, in some cases, a one to many relationship may be desired for certain input data sets. Therefore, the data set configuration may configure the pre-processor system to not extract or filter using the driver data set to enable a one to many relationship top be extracted from certain input data sets. For example, some entries (e.g., some rows) of a data set may be a nested entry that includes multiple entries (e.g., an array), as explained in more detail below. In that case, the pre-processor system may not extract or filter using the driver data set.

In some implementations, the pre-processor system may perform extraction by filtering one or more data records (e.g., one or more columns) included an input data sets based on one or more filter parameters indicated by the data set configuration. For example, a filter parameter may indicate a filter criteria for a column of an input data set. The filter criteria and/or the filter parameter may indicate that the pre-processor system is to filter the column by performing a structured query language (SQL) operator. For example, the filter criteria and/or the filter parameter may indicate that the pre-processor system is to filter the column to identify a maximum value, a minimum value, an equal to value (e.g., values equal to a filter input), less than values (e.g., values less than a filter input), greater than values (e.g., values greater than a filter input), less than or equal to values, greater than or equal to values, ascending values (e.g., to sort values in the column in ascending order), descending values (e.g., to sort values in the column in descending order), and/or any other SQL operator.

In some implementations, the pre-processor system may perform extraction by aggregating one or more data records included in an input data set to identify one or more data entries based on an aggregation function indicated by the data set configuration. For example, the pre-processor system may identify a parameter of the data set configuration indicating one or more elements (e.g., one or more columns) of an input data set to aggregate (e.g., link or group together). The data set configuration may indicate an aggregation function to be performed for each aggregated column or element. For example, the pre-processor system may group two columns together, a first column indicating account identifiers and a second column indicating account balances. The pre-processor system may identify a column to aggregate and/or an aggregation operation for the column based on parameters indicated by the data set configuration.

In some implementations, a first parameter of the data set configuration may indicate a first aggregation operation, such as to filter the first column to identify one or more account identifiers (e.g., to filter or sort the first column). A second parameter of the of the data set configuration may indicate a second aggregation operation, such as to identify a maximum or minimum value in the second column corresponding to the one or more account identifiers of the first column (e.g., there may be 5 entries in the second column corresponding to the one or more account identifiers of the first column and the second aggregation operation may indicate that the pre-processor system is to identify a maximum or minimum value from the 5 entries).

In some implementations, the pre-processor system may perform extraction by casting (e.g., re-naming or re-formatting) one or more data records included an input data set to a new column or a new format based on a casting parameter indicated by the data set configuration. For example, the pre-processor system may change a data format or a data type of data included in a column (e.g., from a string format to a number format). In some implementations, the pre-processor system may change a name or identifier of a column or element of the input data set. In some implementations, the pre-processor system may concatenate multiple columns into a single column. In some implementations, the pre-processor system may apply a regular expression rule to modify data included in a column, such as modifying a symbol or a value in a data entry to another symbol or another value (or removing the symbol or value). For example, the data set configuration may configure the pre-processor system to remove characters located between two "*" symbols. In some implementations, the data set configuration may configure the pre-processor system to change a "-" to another symbol, variable, and/or character or to remove the "-" from the data entry.

In some implementations, the pre-processor system may perform extraction by nesting one or more data records included in an input data set to create a data array of the one or more data records based on a nesting parameter indicated by the first data set configuration. For example, if the data set configuration indicates that one or more data records are to be nested, then the pre-processor system may generate an array of the one or more data records to be included in an output data set.

In some implementations, the pre-processor may perform a validation process for the extracted data identified by the pre-processor system (block 235). For example, the pre-processor may perform a validation process to determine whether an improper duplicated data record has been generated or extracted by the pre-processor system. In some implementations, the pre-processor may determine whether an improper duplicated data record has been generated or extracted by the pre-processor system based on an indication included in the data set configuration. For example, for input data sets that the pre-processor system is to create nested data arrays for, the extracted data will include duplicates (e.g., proper duplicates) because of the nested array. Therefore, the data set configuration may configure the pre-processor system to not perform the validation process for some input data sets. In some implementations, the pre-processor system may refrain from performing the validation process for some input data sets (e.g., without being configured by the data set configuration) based on determining that the extracted data from the input data set includes a nested array. By refraining from performing the validation process for some input data sets (e.g., that include proper duplicates), computing resources (e.g., processing resources) may be conserved by the pre-processor system.

Additionally, performing the validation process for other input data sets may enable the pre-processor system to identify failed or bad records. For example, if the pre-processing operation should produce a one-to-one relationship (e.g., no duplicated records), then duplicated data entries may cause a cascading effect in a generated output data set (e.g., as there are more records than intended in the extracted data). This may cause issues in joining the extracted data, in generating the output data set, and/or in analyzing the output data set at a later time, among other examples. Performing the validation process enables the pre-processor system to identify the improper duplicate records and remedy or remove the improper duplicate records prior to the improper duplicate records causing issues. As shown in FIG. 2, the pre-processor system may store the failed data records (e.g., identified by performing the validation process) in a data store.

The pre-processor system may perform a joining operation of the extracted data from the set of input data sets (block 240). For example, the pre-processor system may join (e.g., group) the desired data (e.g., the extracted data) into an output file (e.g., an output data set) based on a file type or format indicated by the data set configuration. For example, the pre-processor system may group the extracted data by file type indicated by the data set configuration. For example, data included in the extracted data may be associated with a data type (e.g., customer information, account information, and/or vendor information). The pre-processor system may group data in the extracted data by the data type (e.g., grouping extracted data with the same or similar data type together). The data set configuration may indicate a primary file type (e.g., customer, account, and/or vendor). The pre-processor system may join the extracted data based on the primary file type, such that the extracted data is grouped or joined in a meaningful way (e.g., with the most relevant information for a use case grouped together).

For example, in some implementations, the pre-processor may join the extracted data into an output file that includes a first data set that is joined based on a first file type indicated by the data set configuration, and a second data set that is joined based on a second file type indicated by the data set configuration. For example, the pre-processor system may generate multiple output data sets, that are joined or grouped together by the file type associated with the extracted data. In some implementations, the pre-processor system may join the multiple output data sets into a single, final output data set (e.g., by joining output data sets associated with different file types). For example, the pre-processor system may join the multiple output data sets into a single, final output data set based on a primary file type (e.g., using the extracted data associated with the primary file type as the primary data and/or root level information when joining the output data sets). This improves access to the extracted data from an analytics perspective as the pre-processor system may aggregate and/or join the extracted data based on relevant data for a specific use case.

In some implementations, after generating one or more output data sets, the pre-processor system may perform one or more validation processes. For example, the pre-processor system may perform a validation process to ensure that information indicated in a driver data set is included in the one or more output data sets. In some implementations, the pre-processor system may perform a validation process to ensure that there is a one-to-one relationship for certain data entries (e.g., that each customer identifier is linked with an account identifier).

The pre-processor system may write the one or more output data sets to an output location (block 245). For example, the pre-processor system may transmit the one or more output data sets to an output location. The output location may be another device, a data store, and/or a cloud storage location, among other examples. For example, a system configuration (and/or a data set configuration) may indicate the output location for the one or more output data sets. The pre-processor system may transmit the one or more output data sets (e.g., one or more output files) to the output location. This may enable another device to retrieve the one or more output data sets and perform an analysis (e.g., big data analysis) of the one or more output data sets.

In some implementations, as described above, the pre-processor system may identify one or more failed data records and/or one or more bad data records. For example, as part of a validation process (e.g., associated with creating the driver data set, associated with extracting the data, and/or associated with joining the extracted data), the pre-processor system may identify a failed or bad data record. The pre-processor system may store the identified failed data records (block 250). For example, the pre-processor system may store the identified failed data records in a location or file (e.g., a reconciliation file) indicated by the data set configuration.

In some implementations, the pre-processor may terminate a pre-processing operation based on a number of identified failed data records. For example, the data set configuration and/or the system configuration may indicate a termination threshold (e.g., a number or percentage of unacceptable errors over which the pre-processor is to terminate the pre-processing operation). If the number of identified failed data records satisfies the termination threshold, then the pre-processor system may terminate or stop a pre-processing operation. In some implementations, the pre-processing system may transmit an indication or a message to another device indicating that the pre-processor system has terminated the pre-processing operation (e.g., based on the number of identified failed data records satisfying the termination threshold).

In some implementations, the pre-processor system may process failed data records identified and/or stored by the pre-processor system (block 255). For example, rather than running the pre-processing operation again for all of the input data sets based on identifying a failed data record, the pre-processor system may perform a pre-processing operation on only the failed data records identified and/or stored by the pre-processor system. In other words, the pre-processor system may use the failed data records stored in the reconciliation file as the input data sets for the pre-processing operation, as described above. The pre-processor system may perform one or more (or all) of the operations described above for the failed data records stored in the reconciliation file. The pre-processor system may write an output data set generated based on processing (e.g., pre-processing) the failed data records to the output location to enable a complete data set to be analyzed and/or further processed. This conserves processing resources that would have otherwise been used to perform the pre-processing operation for all of the input data sets. In some implementations, after performing the processing of the failed data records identified and/or stored by the pre-processor system, then pre-processor system may remove or delete the failed data records from the location that the failed data records are stored (e.g., the reconciliation folder). This conserves memory resources that would have otherwise been used by the pre-processor system to store the failed data records.

As a result, the pre-processor system may be enabled to pre-process data from different inputs sources and/or in different manners using the same set of executable code for the pre-processor system. For example, the pre-processor system may receive configuration information that includes a first data set configuration and a second data set configuration. The pre-processor system may receive or obtain a first set of input data files based on the first data set configuration. The pre-processor system may process, by executing a single set of executable code and based on the first data set configuration, the first set of input data files. For example, the pre-processor system may process the first set of input data files by extracting desired data from the first set of input data files and joining the desired data into a first output file in a similar manner as described above. The pre-processor system may transmit the first output file based on the first data set configuration (e.g., may write the first output file to a first output location).

The pre-processor system may receive a second set of input data files based on the second data set configuration. The pre-processor system may process, by executing the single set of executable code and based on the second data set configuration, the second set of input data files. For example, the pre-processor system may process the second set of input data files by extracting desired data from the second set of input data files and joining the desired data into a second output file. The pre-processor system may transmit the second output file based on the second data set configuration (e.g., may write the first output file to a second output location).

As indicated above, FIG. 2 is provided as an example. Other examples may differ from what is described with regard to FIG. 2. Although FIG. 2 shows example blocks of example 200, in some implementations, example 200 may include additional blocks, fewer blocks, different blocks, or differently arranged blocks than those depicted in FIG. 2. Additionally, or alternatively, two or more of the blocks of example 200 may be performed in parallel.

Figure 3:
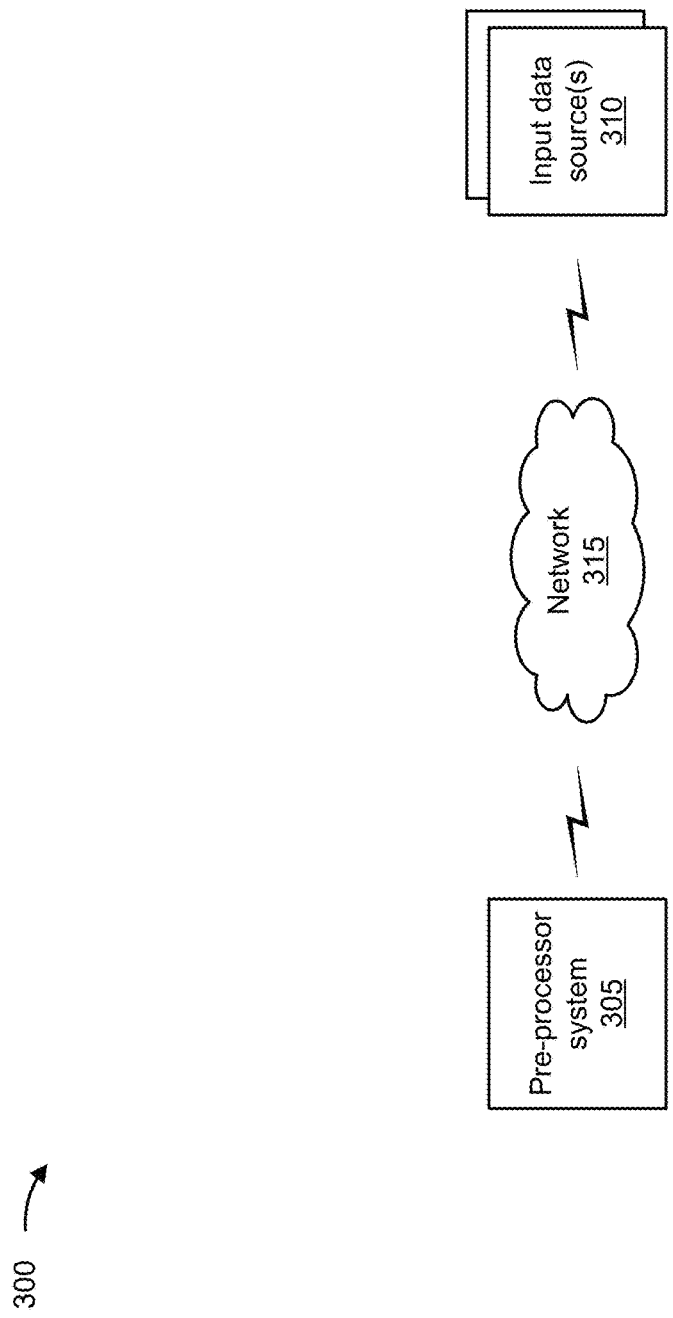
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a pre-processor system 305, one or more input data sources 310, and a network 315. Devices of environment 300 may interconnect via wired connections, wireless connections, or a combination of wired and wireless connections.

The pre-processor system 305 includes one or more devices capable of receiving, generating, storing, processing, providing, and/or routing information associated with a universal pre-processor for extracting and joining data, as described elsewhere herein. The pre-processor system 305 may include a communication device and/or a computing device. For example, the pre-processor system 305 may include a server, such as an application server, a client server, a web server, a database server, a host server, a proxy server, a virtual server (e.g., executing on computing hardware), or a server in a cloud computing system. In some implementations, the pre-processor system 305 includes computing hardware used in a cloud computing environment.

The input data source 310 includes one or more devices capable of receiving, generating, storing, processing, and/or providing information associated with a universal pre-processor for extracting and joining data, as described elsewhere herein. The input data source 310 may include a communication device and/or a computing device. For example, the input data source 310 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input data source 310 may communicate with one or more other devices of environment 300, as described elsewhere herein.

The network 315 includes one or more wired and/or wireless networks. For example, the network 315 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 315 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
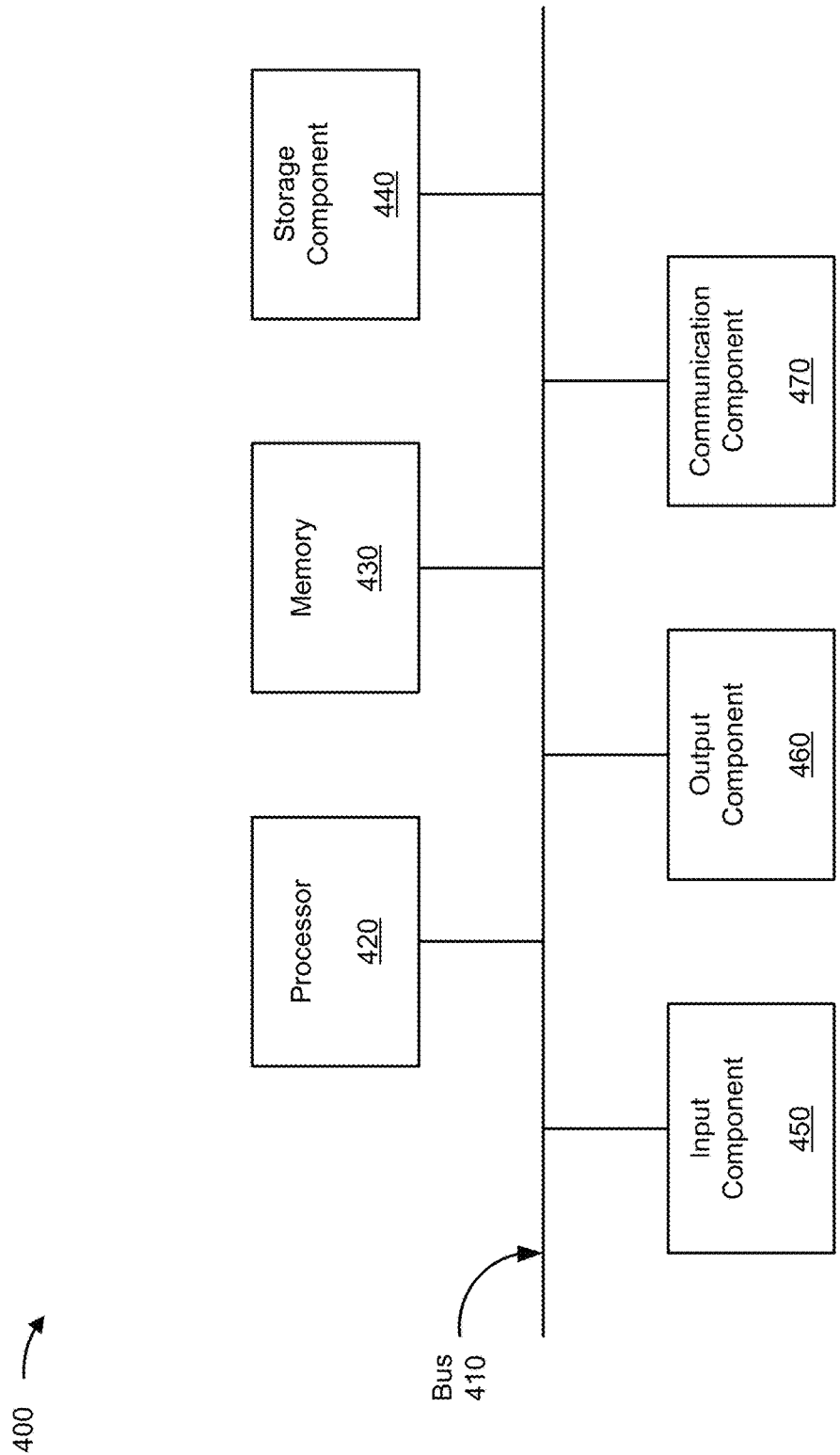
FIG. 4 is a diagram of example components of one or more devices of FIG. 3.

FIG. 4 is a diagram of example components of a device 400, which may correspond to the pre-processor system 305 and/or the input data source(s) 310, among other examples. In some implementations, the pre-processor system 305 and/or the input data source(s) 310 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
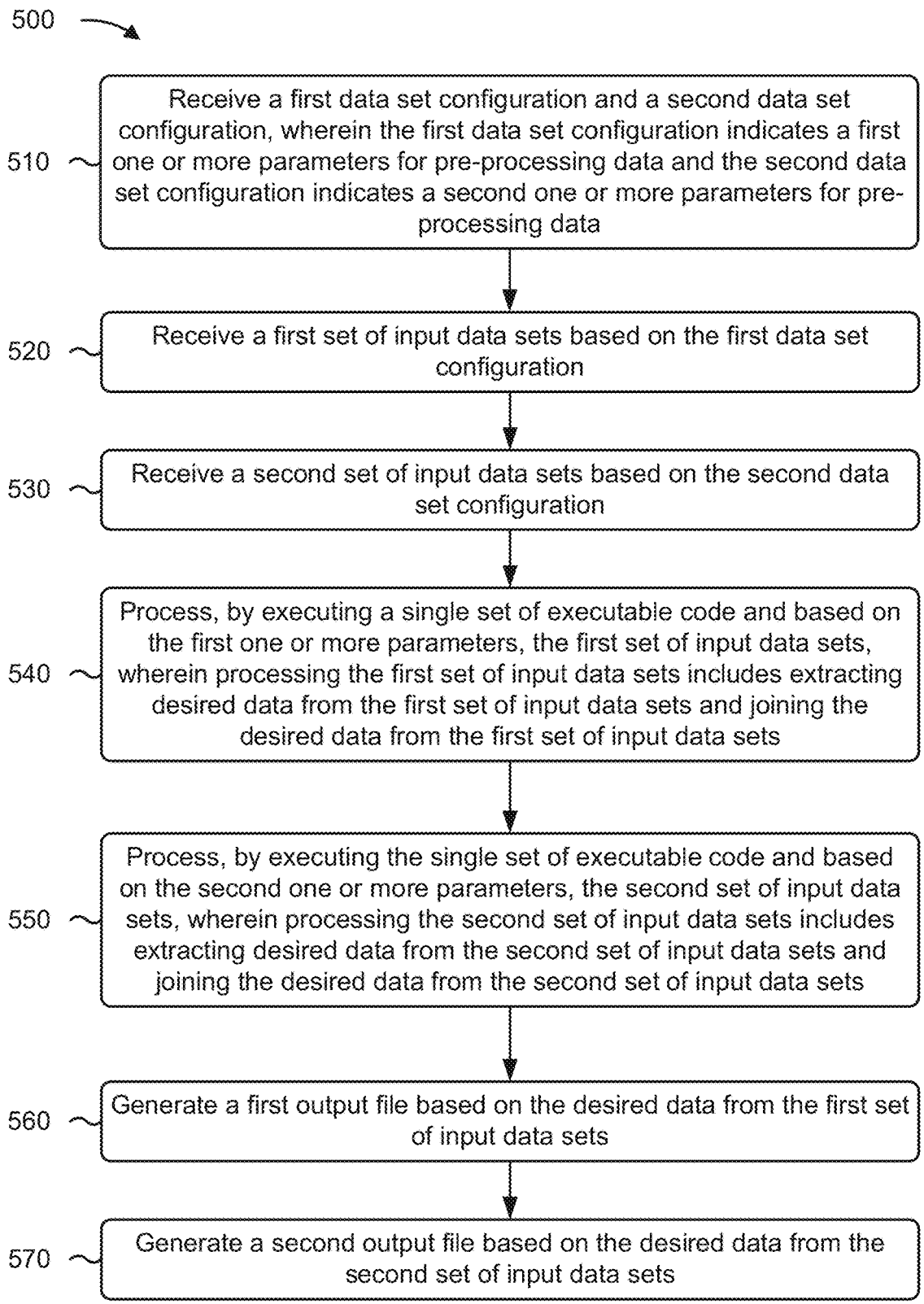
FIG. 5 is a flowchart of an example process relating to a universal pre-processor for extracting and joining data.

FIG. 5 is a flowchart of an example process 500 associated with a universal pre-processor for extracting and joining data. In some implementations, one or more process blocks of FIG. 5 may be performed by a pre-processor system (e.g., the pre-processor system 305). In some implementations, one or more process blocks of FIG. 5 may be performed by another device or a group of devices separate from or including the pre-processor system, such as the input data source 310, among other examples. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving a first data set configuration and a second data set configuration (block 510). In some implementations, the first data set configuration indicates a first one or more parameters for pre-processing data and the second data set configuration indicates a second one or more parameters for pre-processing data. As further shown in FIG. 5, process 500 may include receiving a first set of input data sets based on the first data set configuration (block 520). As further shown in FIG. 5, process 500 may include receiving a second set of input data sets based on the second data set configuration (block 530). As further shown in FIG. 5, process 500 may include processing, based on the first one or more parameters, the first set of input data sets (block 540). In some implementations, processing the first set of input data sets includes extracting desired data from the first set of input data sets and joining the desired data from the first set of input data sets. As further shown in FIG. 5, process 500 may include processing, based on the second one or more parameters, the second set of input data sets (block 550). In some implementations, processing the second set of input data sets includes extracting desired data from the second set of input data sets and joining the desired data from the second set of input data sets. As further shown in FIG. 5, process 500 may include generating a first output file based on the desired data from the first set of input data sets (block 560). As further shown in FIG. 5, process 500 may include generating a second output file based on the desired data from the second set of input data sets (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for pre-processing data from different input sources and with different configurations using a single set of executable code, the system comprising:
   one or more memories; and
   one or more processors, coupled to the one or more memories, configured to:
      receive configuration information that includes a first data set configuration and a second data set configuration, wherein the first data set configuration indicates information for pre-processing data in a first manner and the second data set configuration indicates information for pre-processing data in a second manner,
         wherein the first data set configuration indicates a first output location;
      receive a first set of input data files based on the first data set configuration;
      receive a second set of input data files based on the second data set configuration;
      process, by executing the single set of executable code and based on the first data set configuration, the first set of input data files, wherein processing the first set of input data files includes extracting desired data from the first set of input data files and joining the desired data into a first output file,
         wherein the one or more processors, to process the first set of input data files, are configured to:
            determine that the first set of input data set files includes an input driver data set,
            generate, based on determining that the first set of input data files includes the input driver data set, a driver data set using the first set of input data files,
               wherein the driver data set is used to identify data records or identifiers to be included in the first output file,
            identify one or more failed records based on identifying that one or more data records or identifiers indicated by the first data set configuration are not included in the data driver set, and
            store the one or more failed records in a reconciliation data store indicated by the first data set configuration;
      process, by executing the single set of executable code and based on the second data set configuration, the second set of input data files, wherein processing the second set of input data files includes extracting desired data from the second set of input data files and joining the desired data into a second output file,
         wherein the single set of executable code pre-processes the second data set configuration without modification to the single set of executable code;
      transmit the first output file based on the first data set configuration,
         wherein transmitting the first output file includes writing the first output file to the first output location indicated by the first data set configuration; and
      transmit the second output file based on the second data set configuration.

2. The system of claim 1, wherein the one or more processors are further configured to:
   filter at least one input data file from the first set of input data files based on a driver filter parameter indicated by the first data set configuration;
   select one or more data entries in the at least one input data file based on a driver input parameter indicated by the first data set configuration; and
   create, using the at least one input data file, the driver data set based on filtering the at least one input data file and selecting the one or more data entries.

3. The system of claim 2, wherein the one or more processors, to process the first set of input data files, are configured to:
   process the first set of input data files based on the driver data set.

4. The system of claim 1, wherein the one or more processors, to process the first set of input data files, are configured to:
   extract, by executing the single set of executable code and based on the first data set configuration, the desired data from the first set of input data files by performing one or more actions, wherein the one or more actions include at least one of:
      filtering a partition of a data set included in the first set of input data files using a rank function or a row number function,
      extracting the desired data from the first set of input data files based on the driver data set,
      filtering one or more data records included in the first set of input data files based on one or more filter parameters indicated by the first data set configuration,
      aggregating one or more data records included in the first set of input data files to identify one or more data entries based on an aggregation function indicated by the first data set configuration, casting one or more data records included in the first set of input data files to a new column or a new format based on a casting parameter indicated by the first data set configuration, or nesting one or more data records included in the first set of input data files to create a data array of the one or more data records based on a nesting parameter indicated by the first data set configuration.

5. The system of claim 1, wherein the one or more processors, to process the first set of input data files, are configured to:

join the desired data into the first output file based on a file type indicated by the first data set configuration.

6. The system of claim 1, wherein the one or more processors, to process the first set of input data files, are configured to:

join the desired data into the first output file, wherein the first output file includes a first data set that is joined based on a first file type indicated by the first data set configuration, and a second data set that is joined based on a second file type indicated by the first data set configuration.

7. The system of claim 1, wherein the one or more processors are further configured to:

perform a validation process to validate that the first set of input data files or the second set of input data files has been processed correctly based on the configuration information, wherein performing the validation process includes determining whether an improper duplicated data record has been generated.

8. The system of claim 7, wherein the one or more processors, to perform the validation process, are configured to:

identify one or more failed data records based on performing the validation process; and process, based on the configuration information, the one or more failed data records.

9. The system of claim 1, wherein the one or more processors, to receive the configuration information, are configured to:

receive the first data set configuration or the second data set configuration indicating at least one of:
an indication or a location of input data files associated with the first data set configuration or the second data set configuration,
one or more file type parameters,
one or more validation parameters,
one or more column identifiers of columns to be included in an output file,
one or more filter parameters,
one or more driver parameters,
one or more casting parameters,
one or more window specification parameters, or
one or more aggregation parameters.

10. A method for pre-processing data from different input sources and with different configurations using a single set of executable code, comprising:

receiving, by a device, a first data set configuration and a second data set configuration, wherein the first data set configuration indicates a first one or more parameters for pre-processing data and the second data set configuration indicates a second one or more parameters for pre-processing data,
wherein the first data set configuration indicates a first output location;

receiving, by the device, a first set of input data sets based on the first data set configuration;

receiving, by the device, a second set of input data sets based on the second data set configuration;

processing, by the device executing the single set of executable code and based on the first one or more parameters, the first set of input data sets, wherein processing the first set of input data sets includes extracting desired data from the first set of input data sets and joining the desired data from the first set of input data sets, wherein processing the first set of input data sets further comprises:
determining that the first set of input data sets includes an input driver data set,
generating, based on determining whether that the first set of input data sets includes the input driver data set, a driver data set using the first set of input data sets,
wherein the driver data set is used to identify data records or identifiers to be included in a first output file,
identifying one or more failed records based on identifying that one or more data records or identifiers indicated by the first data set configuration are not included in the data driver set, and
storing the one or more failed records in a reconciliation data store indicated by the first data set configuration;

processing, by the device executing the single set of executable code and based on the second one or more parameters, the second set of input data sets, wherein processing the second set of input data sets includes extracting desired data from the second set of input data sets and joining the desired data from the second set of input data sets, wherein the single set of executable code pre-processes the second data set configuration without modification to the single set of executable code;

generating, by the device, the first output file based on the desired data from the first set of input data sets;

writing, by the device, the first output file to the first output location indicated by the first data set configuration; and generating, by the device, a second output file based on the desired data from the second set of input data sets.

11. The method of claim 10, further comprising:

filtering at least one input data set from the first set of input data sets based on a driver filter parameter indicated by the first data set configuration;

selecting one or more data entries in the at least one input data set based on a driver input parameter indicated by the first data set configuration; and creating, using the at least one input data set, the driver data set based on filtering the at least one input data set and selecting the one or more data entries.

12. The method of claim 11, further comprising:

performing a driver validation to determine whether data records indicated by the driver input parameter are included in the driver data set.

13. The method of claim 10, wherein processing the first set of input data sets comprises:

extracting, by executing the single set of executable code and based on the first data set configuration, the desired data from the first set of input data sets by performing one or more actions, wherein the one or more actions include at least one of:

performing a window specification function to filter a partition of a data set included in the first set of input data sets, extracting the desired data from the first set of input data sets based on the driver data set, filtering one or more data records included in the first set of input data sets based on one or more filter parameters indicated by the first data set configuration, aggregating one or more data records included in the first set of input data sets to identify one or more data entries based on an aggregation function indicated by the first data set configuration, re-naming or re-formatting one or more data records included in the first set of input data sets to a new column or a new format based on a casting parameter indicated by the first data set configuration, or nesting one or more data records included in the first set of input data sets to create a data array of the one or more data records based on a nesting parameter indicated by the first data set configuration.

14. The method of claim 10, comprising:
grouping the desired data into the first output file based on a file type indicated by the first data set configuration.

15. The method of claim 10, further comprising:
performing a validation process to validate that the first set of input data sets or the second set of input data sets has been processed correctly, wherein performing the validation process includes determining whether an improper duplicated data record has been generated.

16. The method of claim 10, comprising:
receiving the first data set configuration or the second data set configuration indicating at least one of:
an indication or a location of input data sets associated with the first data set configuration or the second data set configuration,
one or more file type parameters,
one or more validation parameters,
one or more column identifiers of columns to be included in an output file,
one or more filter parameters,
one or more driver parameters,
one or more casting parameters,
one or more window specification parameters, or
one or more aggregation parameters.

17. The method of claim 10, further comprising:
receiving a system configuration indicating at least one of:
an indication or a location of the first data set configuration or the second data set configuration,
an output location for output files,
identifier information,
security information, or
environment information.

18. A non-transitory computer-readable medium storing a set of instructions, the set of instructions comprising:
one or more instructions that, when executed by one or more processors of a system, cause the system to:
receive configuration information that includes a first data set configuration and a second data set configuration, wherein the first data set configuration indicates information for pre-processing data in a first manner and the second data set configuration indicates information for pre-processing data in a second manner,
wherein the first data set configuration indicates a first output location;
receive a first set of input data files based on the first data set configuration, and
wherein the system is associated with pre-processing data from different input sources and with different configurations using a single set of executable code;
receive a second set of input data files based on the second data set configuration;
process, by executing the single set of executable code and based on the first data set configuration, the first set of input data files, wherein processing the first set of input data files includes extracting desired data from the first set of input data files and joining the desired data into a first output file,
wherein the one or more instructions, that cause the system to process the first set of input data files, cause the system to:
determine that the first set of input data set files includes an input driver data set,
generate, based on determining that the first set of input data files includes the input driver data set, a driver data set using the first set of input data files,
wherein the driver data set is used to identify data records or identifiers to be included in the first output file,
identify one or more failed records based on identifying that one or more data records or identifiers indicated by the first data set configuration are not included in the data driver set, and
store the one or more failed records in a reconciliation data store indicated by the first data set configuration;
process, by executing the single set of executable code and based on the second data set configuration, the second set of input data files, wherein processing the second set of input data files includes extracting desired data from the second set of input data files and joining the desired data into a second output file,
wherein the single set of executable code pre-processes the second data set configuration without modification to the single set of executable code;
transmit the first output file based on the first data set configuration,
wherein the one or more instructions, that cause the system to transmit the first output file, cause the system to write the first output file to the first output location indicated by the first data set configuration; and
transmit the second output file based on the second data set configuration.

19. The non-transitory computer-readable medium of claim 18, wherein the one or more instructions, that cause the system to receive the configuration information, further cause the system to:
receive the first data set configuration or the second data set configuration indicating at least one of:
an indication or a location of input data files associated with the first data set configuration or the second data set configuration,
one or more file type parameters,
one or more validation parameters,
one or more column identifiers of columns to be included in an output file,
one or more filter parameters,
one or more driver parameters, one or more casting parameters,
one or more window specification parameters, or
one or more aggregation parameters.

20. The non-transitory computer-readable medium of claim 18, wherein the one or more instructions, that cause the system to receive the configuration information, further cause the system to:
receive a system configuration indicating at least one of:
an indication or a location of the first data set configuration or the second data set configuration,
the output location for output files associated with the configuration information,
identifier information associated with the configuration information,
security information associated with the configuration information, or
environment information associated with the configuration information.

* * * * *

UNITED STATES PATENT AND TRADEMARK OFFICE
CERTIFICATE OF CORRECTION

PATENT NO. : 11,809,440 B2
APPLICATION NO. : 17/230546
DATED : November 7, 2023
INVENTOR(S) : Jemima Samuel It is certified that error appears in the above-identified patent and that said Letters Patent is hereby corrected as shown below:

In the Claims

In Claim 10, Column 24, Line 15, "...generating, based on determining whether that..." should be changed to --generating, based on determining that...--.

Signed and Sealed this
Seventh Day of May, 2024

Katherine Kelly Vidal
*Director of the United States Patent and Trademark Office*